N. T. Folsom,
Atmospheric Dental Plate.
No. 4,290. Reissued Mar. 7. 1871.
Fig. 1.
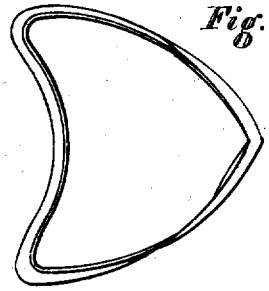
Fig. 2.
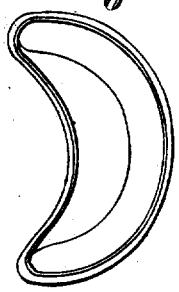
Fig. 3.
Witnesses.
Jas. E. Hutchinson
H. N. Marr
Inventor.
N. T. Folsom
Alexander Mason
Atty's
N. PETERS, PHOTO-LITHOGRAPHER, WASHINGTON, D. C.

United States Patent Office.

NEHEMIAH T. FOLSOM, OF LACONIA, NEW HAMPSHIRE.

Letters Patent No. 60,871, dated January 1, 1867; reissue No. 4,290, dated March 7, 1871.

IMPROVEMENT IN ATMOSPHERIC DENTAL PLATES.

The Schedule referred to in these Letters Patent and making part of the same.

*To all whom it may concern:*

Be it known that I, NEHEMIAH T. FOLSOM, of Laconia, in the county of Belknap and State of New Hampshire, have invented a new and useful Improvement in the Atmospheric Plates of Artificial Teeth; and I do hereby declare that the following is a full and exact description thereof, reference being had to the accompanying drawing making part of this specification—

Figure 1 being a top view of the atmospheric plate of an upper set of teeth, the same provided with my improvement.

Figure 2 is a perspective view thereof.

Figure 3, a section of one edge of the plate.

Figure 4 is a perspective view of the completed plate.

Like letters designate corresponding parts in all of the figures.

The main difficulty in wearing artificial teeth arises from the imperfection of the means of keeping the air from behind the plates, or bases thereof, so that the air ceases to act with pressure on the outside of the plates. Various ways of obviating this difficulty have been devised, but none are reliable. Air-chambers or hollows in the back surface of the plates are the most common expedient, but not effectual.

I have discovered a very simple and entirely successful means of effecting this important object. It consists in the employment of a slight ridge raised above the surface of the plate, generally at or near the edge thereof, which ridge may be of any suitable material, the said ridge bearing against the gums or inside surface of the mouth and serving as a packing surface to exclude the air with great certainty and efficacy, substantially as herein set forth.

The ridge is represented by *a* in the accompanying drawing, and although it may project more or less from the surface of the plate A, yet the amount of projection required in most cases is quite little, as shown in fig. 3, which indicates the full size; and it may vary at different places, so as to adapt it to the uneven surface of the mouth.

In fitting the plate to the mouth there will be found depressions and projections, hard places and soft, with greater or lesser thickness of skin or other soft tissue over the bones and cartilage around the mouth. Then, to adapt the plate to this unevenness or roughness of surface with my packing-ridge, all that is necessary is to pare away the ridge more or less, as the surface may require, and thus the plate is very readily fitted; whereas with the whole surface of the plate to fit, the operation is very tedious, difficult, and uncertain. Once fitted, since this ridge is sure to bear all along against the surface of and indents itself in the skin, the atmosphere is everywhere excluded, and it never fails to retain the plate with certainty.

From the nature and object of this invention it will at once be perceived that the ridge most properly should be placed near the edges of the plate, so as to inclose as much of the surface thereof as can conveniently be done; and such is the arrangement that I usually employ and recommend, substantially as I have indicated in the drawing. But I do not wish to confine myself to any particular position, direction, or distance from the edge of the plate.

For similar reasons I also intend to have the ridge extend entirely around the plate, and yet I do not intend to limit myself to that, since a ridge going partially around the plate would be useful, and might in many cases be sufficient to securely hold the plate.

I also contemplate, generally, only the use of one ridge around each plate; but there may be two or more such ridges, parallel or otherwise, and all or any of them going entirely around the plate or only partially around. All such modifications I intend to include and claim in this invention.

This ridge or ridges, wholly or only partially encircling the plate, may be used in connection with atmospheric chambers or hollows in the plate.

The invention is applicable to any kind of material used for the plates or bases of the teeth, whether of gold, vulcanized India rubber, or other substance.

The drawing represents the invention applied to the upper teeth. It is also equally applicable to the lower teeth.

The ridge is ordinarily molded and cast with the plate, and may be of about the form and width shown, or may vary therefrom, as desired and found practicable.

What I claim as my invention, and desire to secure by Letters Patent, is—

One or more packing-ridges of any suitable material, extending wholly or partially around, at or near the edge and surface of a dental plate, substantially as and for the purposes herein set forth.

In testimony that I claim the foregoing I have hereunto set my hand this 30th day of November, 1870.

NEHEMIAH T. FOLSOM.

Witnesses:

C. L. EVERT,

A. N. MARR.